April 26, 1949.   M. L. NELSON   2,468,269
RADIO DIRECTION FINDING EQUIPMENT
Filed Nov. 3, 1943   4 Sheets-Sheet 1
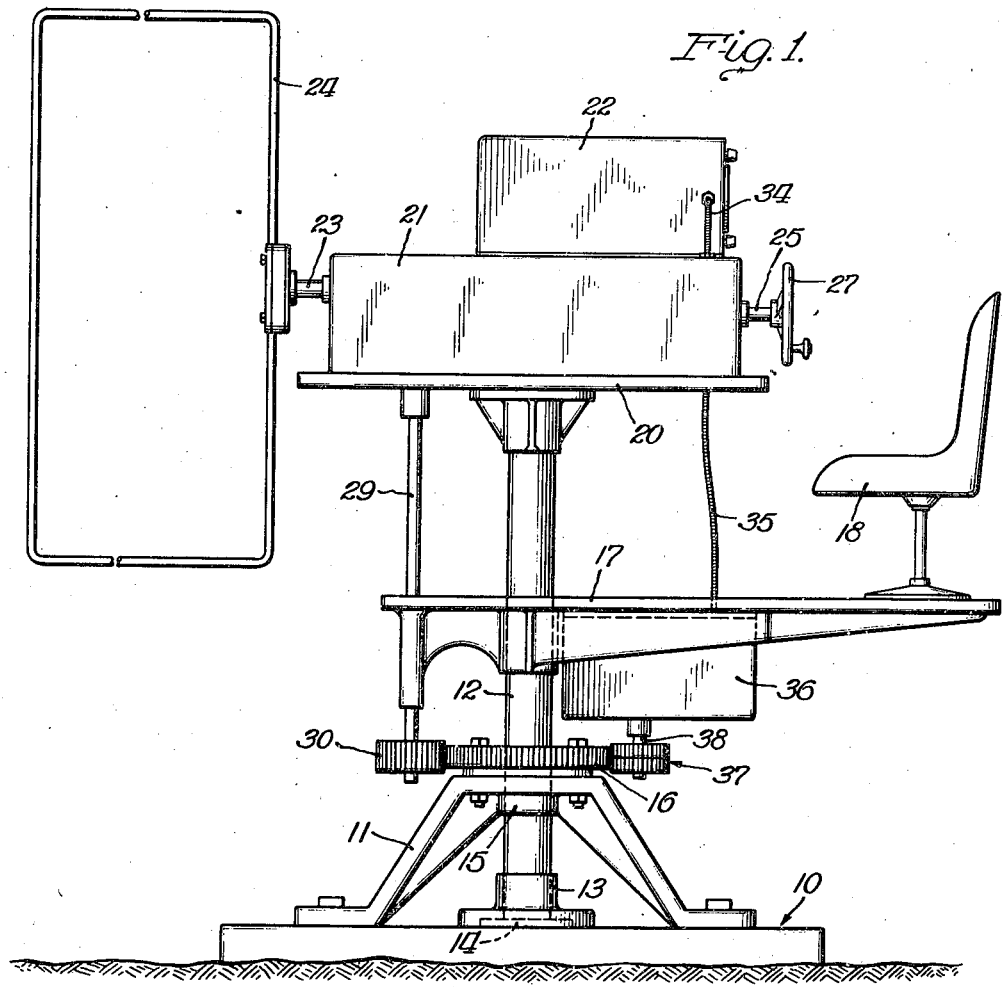
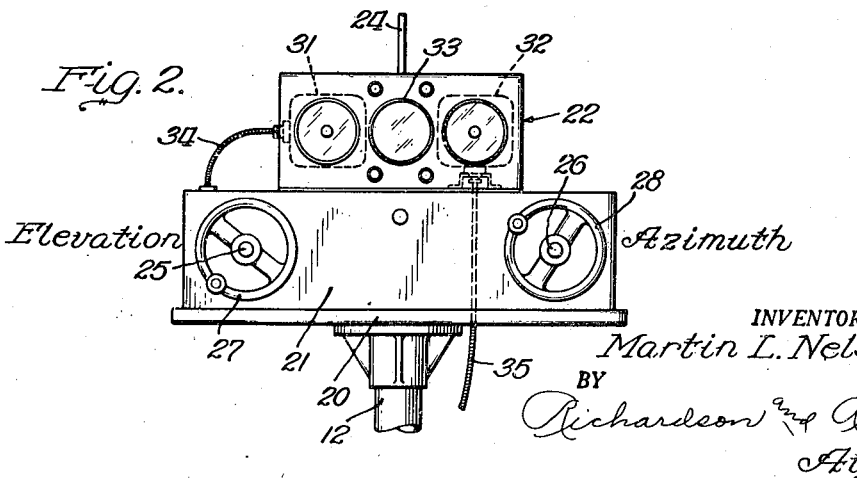
INVENTOR.
Martin L. Nelson April 26, 1949.  M. L. NELSON  2,468,269
RADIO DIRECTION FINDING EQUIPMENT
Filed Nov. 3, 1943  4 Sheets-Sheet 2
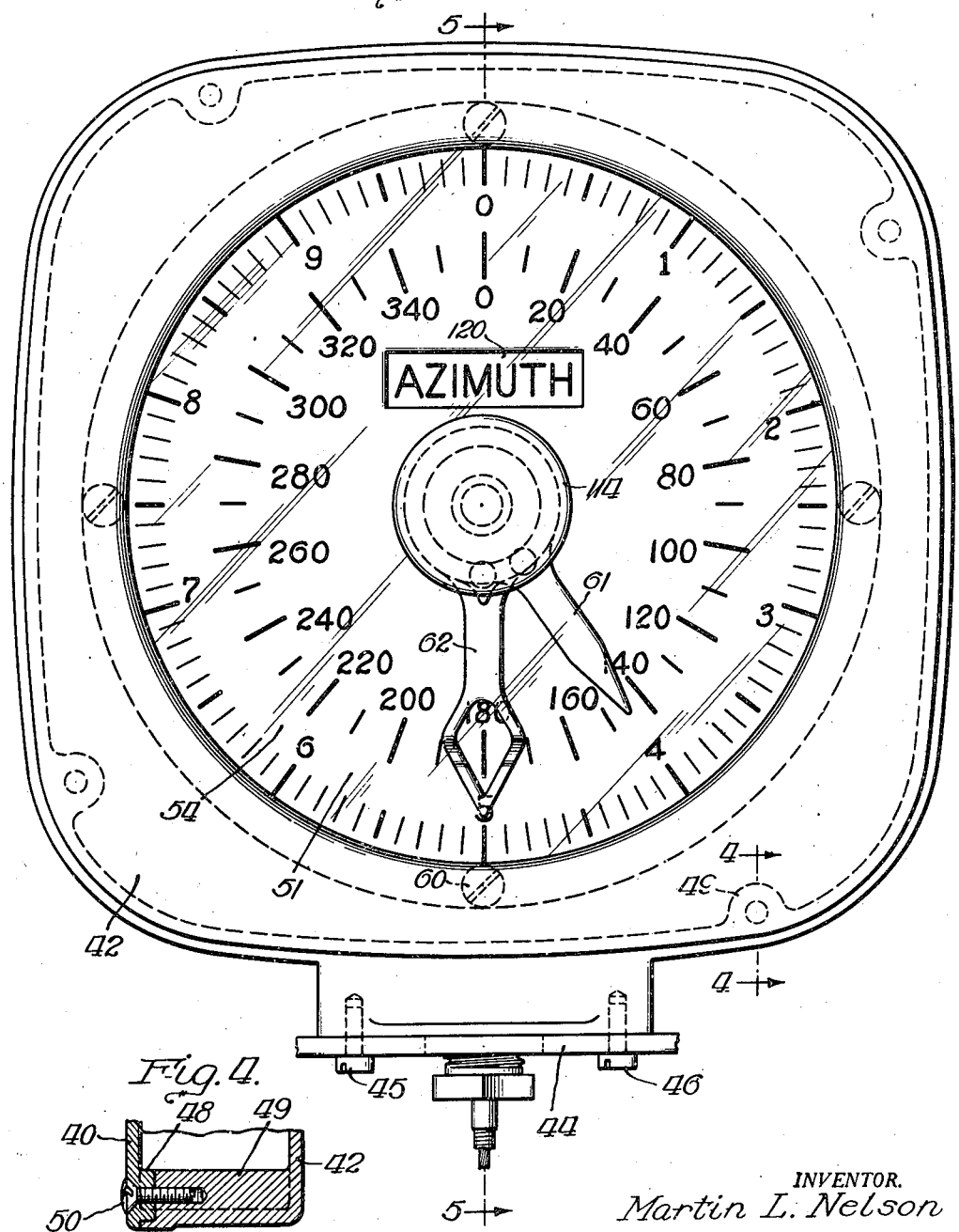
INVENTOR.
Martin L. Nelson
BY
Richardson and Quer
Attys.

April 26, 1949.  M. L. NELSON  2,468,269
RADIO DIRECTION FINDING EQUIPMENT
Filed Nov. 3, 1943  4 Sheets-Sheet 3

INVENTOR.
Martin L. Nelson
BY
Richardson and Auer
Attys.

April 26, 1949.   M. L. NELSON   2,468,269
RADIO DIRECTION FINDING EQUIPMENT
Filed Nov. 3, 1943.   4 Sheets-Sheet 4
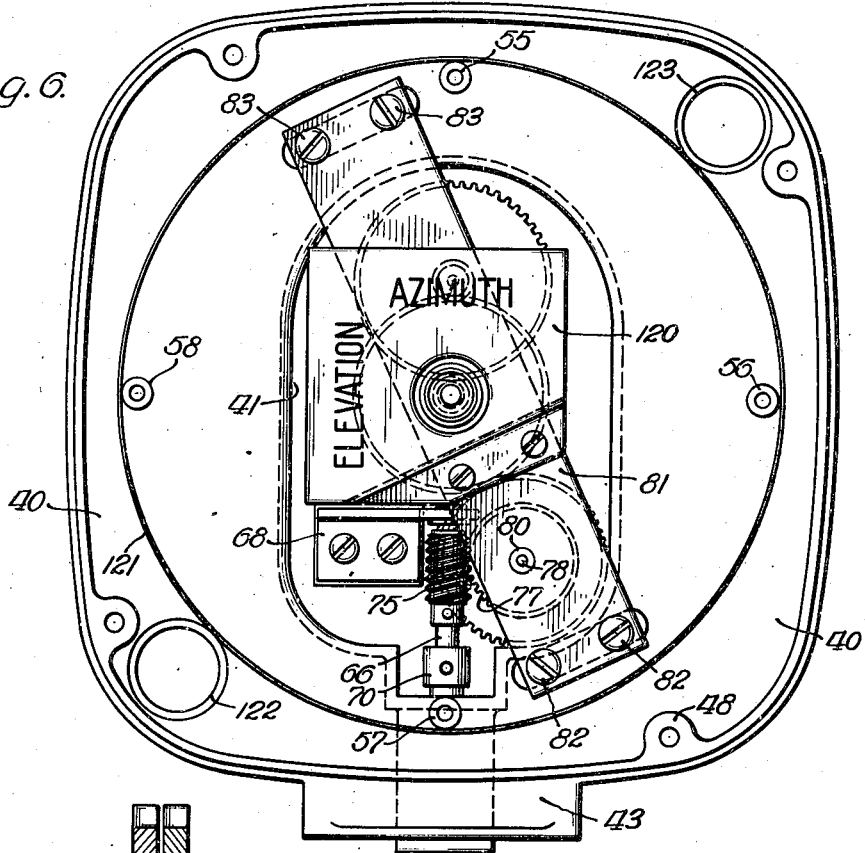
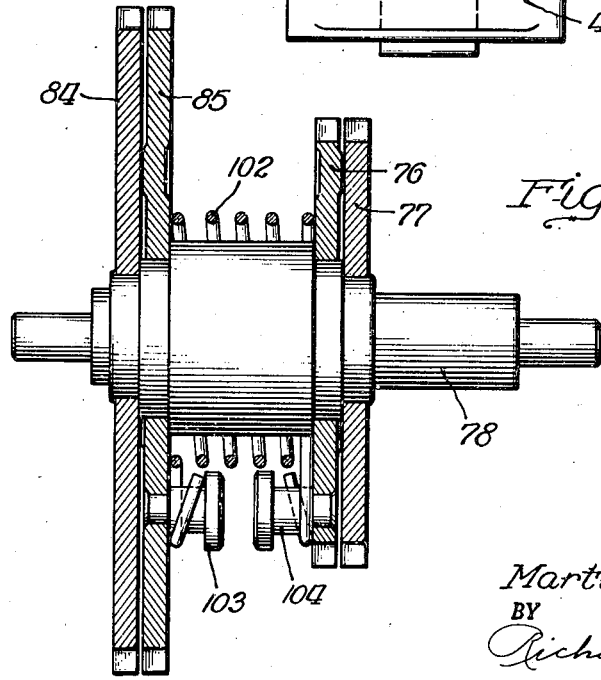
INVENTOR.
Martin L. Nelson
BY
Richardson and Guer
Attys.

Patented Apr. 26, 1949

2,468,269

UNITED STATES PATENT OFFICE 2,468,269

RADIO DIRECTION FINDING EQUIPMENT

Martin L. Nelson, Park Ridge, Ill., assignor to Production Instrument Company, Chicago, Ill., a corporation of Illinois Application November 3, 1943, Serial No. 508,811

15 Claims. (Cl. 343—115)

1

The present invention relates in general to radio direction finding equipment, but more in particular to equipment of this character which is adapted for use in ascertaining the azimuth and elevation of a distant signal source from which a radio signal is being received. The signal source may be an airplane, for example, and the signal may be transmitted or reflected from the airplane.

The invention is mainly concerned with indicating means which form part of the equipment, and the object of the invention is to produce a very accurate device for indicating the azimuth and elevation of a distant signal source, together with arrangements for operating the same.

A specific object of the invention is the provision of a new and improved degree indicator adapted to be operated or controlled from a device which may be oriented with respect to a reference line such as the meridian passing through the point where the equipment is located.

The invention and special features thereof will be described more in detail hereinafter, reference being had to the accompanying drawings, in which—

Fig. 1 is a diagrammatic representation of a direction finding equipment embodying the invention;

Fig. 2 is a partial view of the equipment as seen from the right in Fig. 1, showing the arrangement of the instruments and the operating wheels;

Fig. 3 is a front view of the degree indicator;

Fig. 4 is a partial cross-section on the line 4—4, Fig. 3;

Fig. 6 is a front view of the degree indicator with the cover, hands and dial removed; and Fig. 7 is a view showing the anti-backlash device which is used in the drive for the hands of the degree indicator.

Figure 5:
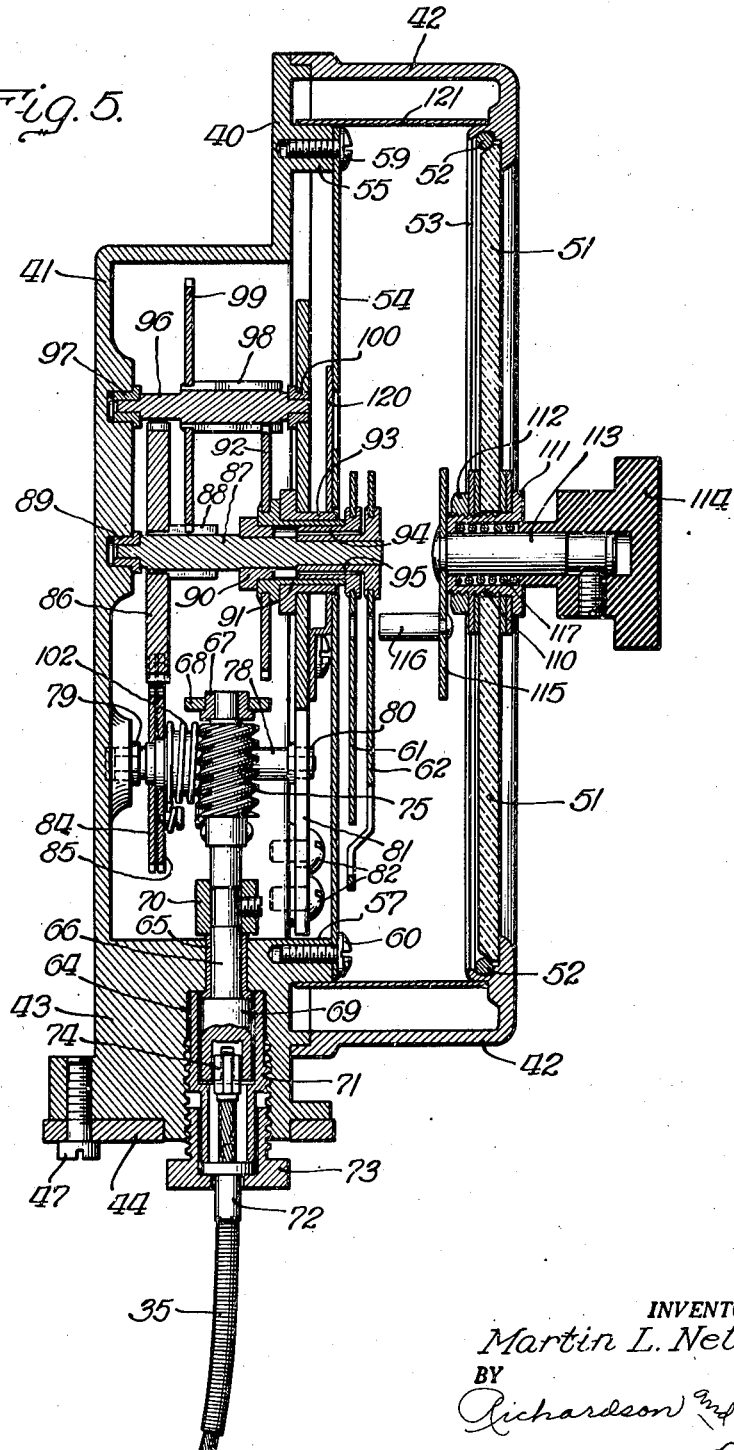
Fig. 5 is a cross-section on the line 5—5, Fig. 3.

The general arrangement of the complete equipment will first be described with reference to Figs. 1 and 2. The illustration is diagrammatic but will suffice for an understanding of the relationship between the various parts and their functions.

The reference character 12 indicates a vertical post which is rotatably supported on the base 10 by means of an upper bearing 15 in bracket 11, a lower bearing 13, and a thrust bearing 14. The gear 16 is secured to bracket 11 and is thus fixed against rotation. The post 12 supports the rest of the equipment.

A short distance above the gear 16 is disposed

2 a platform 17 which is secured to the post 12 in suitable manner. The platform supports a chair or seat 18 for the operator.

The table 20 is fixed to the post 12 at the upper end thereof. On the table 20 is supported a gear casing 21, from which projects a shaft 23. This shaft supports a signal pick-up device 24, herein diagrammatically shown as a loop, but which may be of any suitable type. The shaft 23 is supported for rotation in suitable bearings.

The shafts 25 and 26 project from the right hand end of the gear casing, in which they are supported for rotation by suitable bearings. The hand wheels 27 and 28 are mounted on the shafts 25 and 26, respectively, and constitute the means by which the shafts can be rotated by the operator. The hand wheel 27 is used for adjusting the elevation of the pick-up device 24 and for this purpose the shaft 25 is suitably connected to shaft 23 by means of gears inside the gear casing 21. The hand wheel 28 is used for the azimuth adjustment. The shaft 26 on which the hand wheel 28 is mounted is geared to the vertical shaft 29 which carries a pinion 30 at the lower end meshing with the fixed gear 16.

Above the gear casing 21 is disposed an instrument casing 22, which houses the elevation and azimuth degree indicator instruments 31 and 32 and the signal-controlled indicator 33. The latter may be a cathode ray oscillograph tube. The radio receiving set associated with the pick-up device 24 may also be located in the instrument casing 22. This receiving set controls the indicator 33.

The elevation degree indicator 31 is driven by a flexible shaft 34 which is connected by suitable gears to the shaft 23. The azimuth degree indicator 32 is driven by a flexible shaft 35 which is connected by suitable gears in the auxiliary gear casing 36 with the shaft 38. Shaft 38 carries the pinion 37 which is in mesh with the fixed gear 16.

For reasons which will appear later a rather high gear ratio is employed in connection with the drive for the flexible shafts 34 and 35. The gear ratio may be, for example, 432 to 1. This means that one complete rotation of the post 12 will cause the shaft 35 to rotate 432 times. Likewise one complete rotation of shaft 23 will produce 432 rotations of shaft 34.

The degree indicator instrument shown in Figs. 3 to 7, inclusive, which is assumed to be the azimuth indicator 32, Fig. 2, includes a casing which comprises a rectangular flanged plate 40, an oblong gear housing 41 which is formed integrally with the plate 40, and a cover 42. The shape of these parts will be clear from Figs. 3, 5 and 6.

The plate 40 and gear housing 41 are preferably made as a one-piece casting which may be of steel, aluminum or other suitable material. The casting has an extension 43 of the gear housing, said extension being of generally triangular cross-section and projecting a short distance below the margin of plate 40. The extension 43 is drilled and tapped for three screws 45, 46 and 47 by means of which the indicator is secured to a member 44. The latter may be a wall of the instrument casing or a metal strap or bracket which is employed for properly mounting the indicator in the instrument casing.

The cover 42 also is preferably a casting and has a peripheral flange which overlaps the flange on plate 40, as shown in Fig. 5. The plate 40 is provided with four bosses such as 48, Figs. 4 and 6, which are in alignment with four corresponding bosses such as 49, Figs. 3 and 4, when the cover is in place. The bosses 49 are drilled and tapped to receive screws such as 50 which extend through the plate 40 from the back side thereof. These screws hold the cover securely on the plate 40.

The cover 42 has a large circular opening, as seen in Fig. 3. In back of the rim forming this opening and closing it is disposed a circular glass plate 51 which is held in place by means of the annular flange 53 and the expansible split ring 52, as best seen in Fig. 5.

In back of the glass plate 51 is positioned the calibrated dial 54, which may be made of sheet metal. The dial is mounted on the plate 40 of the casing by means of four bosses 55—58, Fig. 6, and four screws such as 59 and 60, Fig. 5, which pass through the dial and are threaded into tapped holes in the bosses.

The dial has a central opening to pass the sleeves on which the hands are mounted. There are two hands, a short hand 61 and a long hand 62, the latter being on top and having near its free end a triangular opening through which the free end of the short hand can be seen when the hands are in alignment. The dial carries two scales associated with the two hands, respectively. The inner scale with which the short hand 61 coacts is calibrated in increments of ten degrees and reads from 0 to 360 degrees in a clockwise direction. This is the rough scale and can be read to the nearest ten degree calibration, such as 100, 110, 120, etc. The outer scale with which the long hand coacts is the fine scale and reads from 0 to 10 degrees by increments of one-tenth of a degree. One complete rotation of the long hand (10 degrees) corresponds to one thirty-sixth of a rotation of the short hand (also 10 degrees) from which it will be understood that the long hand rotates thirty-six times as fast as the short hand. This will be explained more fully later on in connection with the gearing for driving the hands.

It will be appreciated that the arrangement of rough and fine scales associated with the two hands, respectively, adapts the indicator instrument for very accurately reading. As the hands are shown in Fig. 3 the indicator reads exactly 145 degrees. It will be obvious, however, that with the aid of the long hand an accurate reading such as 145.3 degrees may be made and that by estimating the position of the long hand between two adjacent calibration marks a reading such as 145.35 may be approximated with considerable accuracy.

The indicator hands are driven by the flexible shaft 35, Figs. 1, 2 and 5, assuming that the azimuth indicator 32 is being considered. The drive mechanism will now be described in detail.

The extension 43 of the casing is provided with a central bore 64 which is threaded for the greater part of its length and which communicates with the interior of the gear housing by a bore of smaller diameter in which the bearing 65 is inserted. This bearing supports the driven shaft 66 at one end, the other bearing being indicated at 67. The bearing 67 is supported on an L-shaped bracket 68 which is fastened by two screws to the bottom of the gear housing as shown in Fig. 6. The shaft 66 has a head 69 which engages the flanged end of bearing 65. In loose engagement with the other end of the bearing 65 is a collar 70 surrounding the shaft 66 and fixed thereto by a set screw. This arrangement prevents axial play of the shaft.

The flexible shaft 35 is coupled with the shaft 66. There is a tubular member 71 which is received in the threaded bore 64 of extension 43 and screwed in as far as it will go. The flexible shaft 35 has a flanged end bearing member 72 which is attached to the sheath of the shaft and the flange of which is clamped against the end of member 71 by means of a threaded thimble 73. The flexible shaft proper terminates in a splined coupling member 74 which fits in a corresponding recess in the head 69 of shaft 66. This is a known coupling arrangement.

The shaft 66 carries a worm 75, meshing with two worm gears 76 and 77, Fig. 7, which are supported on the shaft 78. One bearing 79 for this shaft is fitted in a boss at the bottom of the gear housing and another bearing 80 is carried on the bearing plate 81. The bearing plate 81 extends diagonally across the gear housing and is fastened to plate 40 of the casing by means of screws 82 and 83, as shown clearly in Fig. 6.

The shaft 78 also supports the two gears 84 and 85, which are in mesh with the gear 86 on the main shaft 87. The main shaft 87 is thus driven by the shaft 66 through the medium of worm 75, worm gears 76 and 77, shaft 78, gears 84 and 85 and gear 86.

The two pairs of gears on shaft 78 and the spring 102 constitute an anti-backlash device for eliminating play in the drive between shafts 66 and the main shaft 87. Referring to Fig. 7, the outside gears 84 and 77 have a press fit on their associated hubs to which they may be additionally secured by staking. These two gears therefore are fixed on shaft 78. The two inner gears 85 and 76, on the other hand, have a loose or running fit on their respective hubs. These two gears have the studs 103 and 104 projecting from the sides thereof. A coiled spring 102 is tensioned between the studs 103 and 104 and tends to rotate the gears 85 and 76 in opposite directions. As a result any two corresponding teeth of gears 76 and 77 which are in operative relation to the worm 75 are held in engagement, respectively, with adjacent teeth of the worm and a similar effect is produced as regards the coaction of the teeth of gears 84 and 85 with the teeth of gear 86. It follows, therefore, that there is no lost motion when the direction of drive is reversed. When the shaft 66 rotates in one direction the drive is through gears 77 and 84, whereas when the shaft 66 rotates in the opposite direction the drive takes place through gear 76, spring 102 and gear 85. The spring 102 should be just stiff enough to drive shaft 87 with a small margin of safety.

The shaft 87 is journalled in a bearing 89 at one end which is fitted in a boss at the bottom of the gear housing. The other bearing is disposed near the middle of the shaft and comprises a flanged ring 90 having a press fit on the shaft and being rotatable inside the tubular sleeve 91. The sleeve 91 in turn is rotatable in the flanged bearing 93 carried on the bearing plate 81. The shaft 87 is of reduced diameter at the right hand end where it supports a flanged split sleeve 95 to which the long hand 62 is attached. The sleeve 95 is held on the shaft 87 by friction, which is sufficient to cause the shaft to rotate the hand 62 but which nevertheless permits the hand to be rotated independent of the shaft. In a similar manner the short hand 61 is frictionally supported on the rotatable tubular sleeve 91 by means of the flanged split sleeve 94.

The sleeve 91 is driven from the main shaft 87 by means of the pinion 88, gear 99, countershaft 96, pinion 98, and gear 92, the latter being fixed to the hub of sleeve 91. Shaft 96 is journalled in bearings 97 and 100, as shown. The pinions 88 and 98 may be formed integrally with the shafts 87 and 96, respectively; that is, each shaft may include a section of larger diameter in which the corresponding pinion teeth are cut. The gear 86 is pressed onto a section of pinion 88 after the latter has been subjected to a turning operation which cuts the teeth down nearly to the root diameter and is secured in place by staking. When the gear is pressed on, the mutilated teeth of the pinion are forced into the metal of the gear wheel and the latter is more effectively prevented from rotating on the shaft than it would be if pressed onto a smooth round portion of the shaft. The gear 99 may be fixed to shaft 96 in the same manner.

From the foregoing explanation it will be seen that the flexible shaft 35 drives shaft 66 which in turn drives shaft 78 by means of worm 75 and gears 76 and 77. Shaft 78 drives the main shaft 87 by means of gear 84 and 85 and gear 86, and the main shaft rotates the long hand 62. The main shaft 87 also drives the pinion 88 and gear 99 and shaft 96 drives the tubular sleeve 91 by means of pinion 98 and gear 92. The sleeve 91 rotates the short hand 61.

As previously mentioned, the flexible shaft 35 rotates 432 times for each rotation of the equipment shown in Fig. 1 about the vertical post or axis 12. From this it will be evident that there must be a 12 to 1 reduction between shaft 66 and the main shaft 87, to cause the main shaft and the long hand 62 to rotate 36 times for each rotation of the post 12. In one rotation of the post 12 the pick-up device 24 rotates through 360 degrees and in 36 rotations the long hand 62 measures off 360 degrees on the associated scale, or 10 degrees per rotation. It will also be clear that there must be a 36 to 1 reduction between the main shaft 87 and the tubular sleeve 91 which carries the short hand 61, to cause the short hand to make one rotation and measure off 360 degrees on its associated scale for each rotation of the pick-up device about the vertical axis 12. The gear ratios in the described gear train are selected in accordance with the foregoing.

It will be clear that other gear ratios could be used. For example, with the arrangement of indicator hands and scales shown herein, a 36 to 1 gear ratio could be used in the drive for the flexible shaft 35 and a 1 to 1 gear ratio in the drive between the flexible shaft and the main shaft 87. However, the gear ratios described or similar gear ratios which result in a higher speed of the flexible shaft are preferable because they reduce the angular displacement or play between the ends of the shaft when the direction of motion is reversed. This play is due to twisting of the shaft, which depends on the torque, which in turn is inversely proportionate to the speed for the transmission of a given amount of power.

It will be observed that the combination of the flexible shaft operating on low torque and the anti-backlash device in the drive between such shaft and the main shaft insures a very accurate correlation between the movement of the long hand 62 and the movement of the pick-up device 24 about the vertical axis 12. It will be understood, of course, that anti-backlash devices, which may be of any suitable type, are used in the gearing which drives the flexible shaft. The pinion 37, for instance, which meshes with the fixed gear 16 and drives the shaft 38, Fig. 1, may be made in two parts, one of which is fixed to shaft 38 and the other of which is rotatable on the shaft and connected by means of a spring to the other part. These two parts may in fact be regarded as separate pinions or gears assembled side by side on the shaft 38.

The anti-backlash device used in the indicator instrument in the drive between the shaft 66 and the main shaft 87 has a special advantage in that only a single spring is required to eliminate the play at two pairs of gears. This device may be used in the drive for the flexible shaft, even though no worm gears are used in such drive, for the gears 76 and 77, or corresponding gears, can just as well be driven by a plain spur gear as by a worm.

No anti-backlash device is required in the drive between the main shaft 87 and the tubular sleeve which carries the short hand 61, because this hand only has too be read to the nearest ten degree calibration mark and its exact position is of no consequence. If the hand 61 appears to indicate 100 degrees, for instance, the exact number of degrees, whether more or less than 100 degrees, is determined by the position of the hand 62.

The indicator instrument also includes a hand setting device which may be described with reference to Fig. 5. The circular glass plate 51 in the cover 42 has a central opening in which is disposed a threaded tubular sleeve 110. The sleeve 110 forms a flange 111 on one end and a nut 112 is provided at the other end for clamping it to the glass plate 51, suitable washers being interposed as shown in the drawing. The sleeve 110 rotatably supports the shaft 113 to which the knob 114 is attached by a set screw. A spring 117 is disposed between the shank of the knob 114 and an internal shoulder on the sleeve 110. The shaft 113 is longitudinally movable in the sleeve 110 by pressure on the knob 114, but is normally maintained in the position in which it is shown by the spring 117. The shaft 113 is provided with an arm 115, which carries a pin 116. This pin may be inserted into holes in the hands 61 and 62 to set or re-set the hands. In order to set the hands to zero, for example, the knob 114 is rotated until the pin 116 is in alignment with the hole in hand 62. The knob 114 is then pressed in far enough to cause the pin 116 to enter the hole in hand 62, whereupon the knob may be further rotated to pick up hand 61 in the same manner. Both hands may then be simultaneously rotated to zero after which the knob 114 may be released.

The reference character 121 indicates a circular strip of translucent material which is disposed as shown in Figs. 5 and 6. There are two openings 122 and 123 which are adapted to receive lamp sockets inserted from the rear of the casing. These sockets (not shown) carry small lamps for illuminating the face of the dial and the strip 121 acts as a diffuser to prevent glare and render the scales more easily readable.

The elevation indicator 31 may be structurally identical with the azimuth indicator described in the foregoing. In other words, the instrument just described may be used either as an azimuth indicator or as an elevation indicator. As will be seen from Fig. 2, however, in the case of the elevation indicator 31 it is convenient to bring the flexible shaft 34 into the indicator horizontally rather than vertically, which makes it necessary to rotate the indicator 90 degrees so that the extension 43 will be at the side rather than at the bottom. The dial 54 is accordingly rotated 90 degrees with respect to the remainder of the indicator mechanism so that the zeros on the two scales will be disposed at the top, and is fixed in such position. There is a plate 120, Fig. 6, which is attached to the bearing plate 81 just beneath the dial 54 and which bears the words "Azimuth" and "Elevation" disposed at right angles to each other. The dial 54 has a rectangular sight opening, as shown in Fig. 3, through which one or the other of these words can be displayed depending on the angular position of the dial. It follows that the appropriate name is displayed, whether the instrument is used as an azimuth indicator or as an elevation indicator. This expedient makes it unnecessary to stock two instruments or to furnish two dials with each instrument.

The equipment may be set up at any point where it is desired to take bearings on distant signal sources, passing objects such as airplanes, etc. Before beginning operations it is necessary to properly orient the pick-up device with respect to the reference lines from which the azimuth and elevation bearings are to be taken. This may be accomplished in known manner, as by the use of a signal source accurately located on the desired reference lines, after which the hands of the indicator instruments 31 and 32 are set to zero. Thereafter the departure from the reference lines which results from adjustment of the pick-up device to a differently located signal source will be accurately shown by the instruments.

The reference line for the azimuth bearing may be the meridian passing through the point where the equipment is located, while the reference line for the elevation bearing may be the line which is tangent to the circumference of the earth at the same point and in the plane of the meridian.

The equipment preferably operates on the principle that when the pick-up device 24 is properly oriented with respect to a distant signal source a zero or minimum signal will be received. In taking bearings on a distant signal source the operator seated at 18, Fig. 1, adjusts the azimuth and elevation by means of the hand wheels 28 and 27, respectively, and meanwhile observes the indicator 33, which will show decreasing signal strength as the adjustment of the pick-up device becomes more nearly correct. During this operation the azimuth and elevation indicator instruments faithfully follow every angular movement of the pick-up device, and when the adjustment is complete they show the correct bearings to the operator.

It will be noted that the bearing indications are given continuously, which adapts the equipment for use with moving objects. Having located a distant airplane, for example, the operator can follow it by manipulating one or both of the hand wheels and can read the bearings of the airplane at any instant.

The invention having been described, that which is believed to be new and for which the protection of Letters Patent is desired will be pointed out in the appended claims.

I claim:

1. In combination with radio direction finding apparatus having a radio signal pick-up device, which may be rotated to adjust it to a reference line, a degree indicator comprising a pair of rotatable hands and a single stationary dial bearing concentrically arranged scales for coaction with said hands, means for driving said hands responsive to rotation of said pick-up device to show on said scales the amount of rotation in degrees and fractions thereof, and a single adjusting means for setting both said hands to zero on the scales, whereby upon a subsequent rotation of said pick-up device to adjust the same to a distant signal source the said hands will show the bearing of said source with respect to said reference line.

2. In combination with radio direction finding apparatus having a rotatable signal pick-up device, a degree indicator, a shaft in said indicator, means including gears for positively driving said shaft responsive to rotation of said pick-up device, an indicating hand, a stationary dial bearing a scale for coaction with said hand, means for frictionally supporting said hand on said shaft so that such hand is adapted to be driven by said shaft to indicate the extent of rotation of said pick-up device, and means disposed coaxially with said shaft for independently adjusting said hand with reference to said scale.

3. In combination with radio direction finding apparatus having a rotatable signal pick-up device, a degree indicator for measuring the rotation of said pick-up device, said indicator comprising two hands, a single stationary dial bearing concentrically arranged scales one for coaction with each hand, means including speed changing gears for rotating one of said hands a plurality of times responsive to one rotation of said device to indicate the extent of rotation of said pick-up device on its associated scale in increments of one-tenth of one degree, and speed changing gears for rotating the other hand a single time responsive to the said plurality of rotations of the first hand to indicate the extent of rotation of said pick-up device on its associated scale in increments of ten degrees.

4. In combination with radio direction finding apparatus having a rotatable signal pick-up device, a degree indicator for measuring the rotation of said pick-up device, said indicator comprising two hands, means responsive to rotation of said pick-up device for rotating said hands at different speeds, and a single stationary dial having concentrically arranged scales one for coaction with each hand, said scales being calibrated in accordance with the relation between the hand speeds and the rotational speed of said pick-up device to adapt said hands to indicate the extent of rotation in degrees and fractions thereof.

5. In combination with radio direction finding apparatus having a rotatable signal pick-up device, a degree indicator comprising a rotatable hand and a stationary scale for coaction therewith reading from 0 to 360 for one rotation of said hand, a second hand and a stationary scale for coaction therewith reading from 0 to a number which is a predetermined sub-multiple of 360, and means including gears responsive to rotation of said signal pick-up device for rotating said hands at the proper speeds to cause such hands to indicate on their associated scales the amount of the rotation in degrees and fractions of degrees, respectively.

6. In combination with a rotatable signal pick-up device having means for rotating said device to adjust it to a signal source, a degree indicator comprising a rotatable indicating element, and means responsive to rotation of said pick-up device for rotating said element, said last named means including a flexible shaft and speed changing gears for causing said shaft to rotate at a higher speed than said element in order to minimize the torque on the shaft.

7. In combination with a signal pick-up device which may be rotated to adjust it to a signal source, a degree indicator comprising a rotatable indicating element, means including a gear train for rotating said element, control gear means for actuating said gear train, and drive means responsive to rotation of said device for actuating said control gear means, said control gear means including, means for eliminating lost motion in said gear train when the direction of rotation is reversed.

8. The structure and combination defined in claim 7, wherein said control gear means comprises a shaft for rotating said gear train, two pairs of gears mounted on said shaft, one gear of each pair being fixed to said shaft and the other gear of the pair being rotatable thereon, and a spring coiled around said shaft and having its two ends connected to said rotatable gears, respectively.

9. Radio direction finding apparatus comprising a signal pick-up device, first actuating means for rotating said signal pick-up device about a vertical axis, second actuating means for rotating said signal pick-up device about a horizontal axis, a first and a second indicating instrument for coaction with said first and said second actuating means, respectively, a first and a second rotatable drive means operatively responsive to the operation of said first and said second actuating means, respectively, for causing the operation of the associated indicating instrument coacting with such actuating means, gear means disposed within each indicating instrument and operated by the associated rotatable drive means, and indicating means forming part of each indicating instrument and being controlled by said gear means therein for indicating in degrees the extent of rotation of said pickup device about the corresponding axis.

10. The structure and combination defined in claim 9, wherein a pair of rotatable hands coacting with a calibrated dial constitute said indicating means, one of said hands indicating the extent of rotation of said pickup device about the corresponding axis in increments of ten degrees and the other hand indicating the extent of such rotation in increments of one-tenth of one degree.

11. The structure and combination defined in claim 9, wherein said indicating instruments are of identical structure and each is adapted to be mounted in either of two angular positions for use either as an instrument to indicate the extent of rotation of said pick-up device about said vertical axis or as an instrument to indicate the extent of rotation of said pick-up device about its horizontal axis, a name plate disposed in each instrument bearing words which are indicative of the rotation of the pick-up device, a dial in each instrument adapted to be mounted therein in either one of two angular positions depending on the position in which the corresponding instrument is to be mounted, said dial having a sight opening through which one or the other of said words is displayed to indicate the function of the corresponding instrument.

12. The structure and combination defined in claim 9, together with an instrument casing for supporting said indicating instruments, a gear casing, a vertically extending rotatably mounted column for supporting said gear casing and said instrument casing, a fixed gear, means for rotatably mounting on said gear casing said first actuating means, first gear means operated by said first actuating means and coacting with said fixed gear for rotating about said vertical axis said column and said gear and instrument casings thereon, second gear means coacting with said fixed gear incident to the rotation of said column and said gear casing and instrument casing about said vertical axis for rotating said first drive means to cause the operation of said first indicating instrument to indicate in degrees the extent of rotation of said column and said gear casing and instrument casing about said vertical axis, means for rotatably mounting on said gear casing said signal pickup device and said second actuating means for rotating such device about the horizontal axis, said second drive means being rotated responsive to the operation of said second actuating means to cause operation of the indicating instrument associated therewith so as to indicate in degrees the extent of rotation of said pickup device about said horizontal axis.

13. Radio direction finding apparatus comprising a base, a supporting bracket, a stationary gear mounted on said bracket, a supporting column rotatably mounted in said base and in said bracket and vertically extending therefrom through said stationary gear, a platform extending laterally from said column for supporting an operator, a gear casing and an instrument casing disposed on top of said column, first and second rotatable actuating means carried by said gear casing for operation by said operator, a first and a second indicating instrument carried by said instrument casing, a first gear associated with said first actuating means and coacting with said stationary gear responsive to rotation of said first actuating means by said operator for causing rotation of the entire structure including said column, said platform and said gear and instrument casings about the vertical axis of said column, a second gear coacting with said stationary gear incident to the rotation of said structure about said vertical axis, first rotatable drive means operated by said second gear for actuating said first indicating instrument to indicate in degrees the extent of rotation of said structure about said vertical axis, a signal pick-up device rotatably supported by said gear casing for rotation about a horizontal axis responsive to rotation of said second actuating means by the operator, and second rotatable drive means operated incident to rotation of said pick-up device about its horizontal axis for actuating said second indicating instrument to indicate in degrees the extent of such rotation.

14. The structure and combination defined in claim 13, wherein a flexible shaft constitutes the rotatable drive means for each indicating instrument, gear means disposed in each instrument which is operatively actuated by its associated flexible shaft, and indicating means forming part of each instrument and operated by its associated gear means for indicating in degrees and in fractions of degrees the extent of rotation about the corresponding axis.

15. The structure and combination defined in claim 13, wherein a flexible shaft constitutes the rotatable drive means for each indicating instrument, each flexible shaft being rotated responsive to operation of its associated actuating means at a relatively high gear ratio of several hundred revolutions to one complete revolution of said pick-up device about the corresponding axis to minimize its torque, gear means disposed within each indicating instrument which is operatively actuated by its associated flexible shaft, and a pair of rotatable indicating hands coacting with a calibrated dial disposed within each instrument and operated by the associated gear means, one of said hands indicating the extent of rotation of the pick-up device about its corresponding axis in increments of ten degrees and the other hand indicating the extent of such rotation in increments of one-tenth of one degree.

MARTIN L. NELSON.

REFERENCES CITED

The following references are of record in the file of this patent:

UNITED STATES PATENTS

| Number | Name | Date |
|---|---|---|
| 1,692,051 | Patterson | Nov. 20, 1928 |
| 1,715,270 | Bassett | May 28, 1929 |
| 1,769,100 | Beal et al. | July 1, 1930 |
| 1,889,568 | Pickard | Nov. 29, 1932 |
| 2,120,366 | Leib et al. | June 4, 1938 |
| 2,131,952 | House | Oct. 4, 1938 |
| 2,148,923 | Beisser | Feb. 28, 1939 |
| 2,196,231 | Ridgway | Apr. 9, 1940 |
| 2,231,929 | Lyman | Feb. 18, 1941 |
| 2,235,898 | Niemeyer | Mar. 25, 1941 |
| 2,304,446 | Eaton | Dec. 8, 1942 |

FOREIGN PATENTS

| Number | Country | Date |
|---|---|---|
| 565,693 | France | Nov. 10, 1923 |
| 643,907 | France | May 22, 1928 |